US012775311B2

(12) United States Patent
Yamamoto et al.

(10) Patent No.: US 12,775,311 B2
(45) Date of Patent: Oct. 27, 2026

(54) ELECTRONIC DEVICE

(71) Applicant: Panasonic Intellectual Property Management Co., Ltd., Osaka (JP)

(72) Inventors: Koki Yamamoto, Osaka (JP); Keita Endo, Osaka (JP); Junichi Hasegawa, Osaka (JP); Shintarou Tanaka, Osaka (JP); Hiroki Kamezaki, Osaka (JP); Jun Takahashi, Miyagi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 74 days.

(21) Appl. No.: 19/055,588

(22) Filed: Feb. 18, 2025

(65) Prior Publication Data

US 2025/0190030 A1 Jun. 12, 2025

Related U.S. Application Data

(63) Continuation of application No. PCT/JP2023/029270, filed on Aug. 10, 2023.

(30) Foreign Application Priority Data

Sep. 1, 2022 (JP) ................................ 2022-139209

(51) Int. Cl.
*G06F 1/16* (2006.01)

(52) U.S. Cl.
CPC ................................ *G06F 1/1681* (2013.01)

(58) Field of Classification Search
CPC combination set(s) only.
See application file for complete search history.

(56) References Cited

U.S. PATENT DOCUMENTS 6,992,884 B2 * 1/2006 Minaguchi ............ G06F 1/1616 361/679.21
7,075,785 B2 * 7/2006 Minaguchi ............ G06F 1/1616 361/679.09

(Continued)

FOREIGN PATENT DOCUMENTS

| | | | |
|---|---|---|---|
| JP | 2007265113 | A | 10/2007 |
| JP | 2013250900 | A | 12/2013 |
| JP | 2016164633 | A | 9/2016 |

OTHER PUBLICATIONS

International Search Report for related International Patent Application PCT/JP2023/029270 mailed Oct. 31, 2023.

*Primary Examiner* — Lisa Lea-Edmonds
(74) *Attorney, Agent, or Firm* — RENNER, OTTO, BOISSELLE & SKLAR

(57) ABSTRACT

An electronic device of the present disclosure includes a display that includes a panel having a first principal surface, a second principal surface on a side opposite to the first principal surface, and an outer peripheral end portion that connects the first principal surface and the second principal surface, a first housing that houses the display, a second housing that houses an input unit, and a hinge that rotatably connects the first housing and the second housing. The first housing includes a first frame member that surrounds the outer peripheral end portion of the panel, and a second frame member that extends from the first frame member along the second principal surface of the panel and is disposed in a frame shape on the second principal surface side of the panel.

7 Claims, 5 Drawing Sheets

(56) References Cited

U.S. PATENT DOCUMENTS

| | | | | |
|---|---|---|---|---|
| 7,960,913 | B2 | 6/2011 | Yee et al. | |
| 9,161,469 | B2 * | 10/2015 | Han | G06F 1/1679 |
| 9,256,308 | B2 | 2/2016 | Aoki et al. | |
| 9,946,119 | B2 | 4/2018 | Fujita et al. | |
| 12,404,967 | B2 * | 9/2025 | Hosokai | B29C 65/486 |
| 12,463,318 | B2 * | 11/2025 | Fukagawa | G06F 1/1616 |
| 2010/0142133 | A1 * | 6/2010 | Wang | H04M 1/0214 361/679.01 |
| 2013/0308261 | A1 * | 11/2013 | Matsumoto | G06F 1/1662 361/747 |
| 2013/0321311 | A1 | 12/2013 | Aoki et al. | |
| 2016/0262273 | A1 | 9/2016 | Fujita et al. | |
| 2023/0387571 | A1 * | 11/2023 | Fukagawa | H01Q 1/02 |
| 2024/0263733 | A1 * | 8/2024 | Hosokai | B29C 65/486 |
| 2025/0190027 | A1 * | 6/2025 | Yamamoto | G06F 1/1637 |
| 2025/0190030 | A1 * | 6/2025 | Yamamoto | G06F 1/1681 |

* cited by examiner

ELECTRONIC DEVICE

TECHNICAL FIELD

The present disclosure relates to an electronic device.

BACKGROUND ART

PTL 1 discloses an electronic device that includes a touch panel display and an exterior portion having a bezel portion that holds an outer edge portion of the touch panel display over the entire circumference.

CITATION LIST

Patent Literature

PTL 1: Unexamined Japanese Patent Publication No. 2013-250900

SUMMARY OF THE INVENTION

An object of the present disclosure is to provide an electronic device capable of suppressing breakage of a panel of a display.

An electronic device according to one aspect of the present disclosure includes a display that includes a panel having a first principal surface, a second principal surface on a side opposite to the first principal surface, and an outer peripheral end portion that connects the first principal surface and the second principal surface, a first housing that houses the display, a second housing that houses an input unit, and a hinge that rotatably connects the first housing and the second housing. The first housing includes a first frame member that surrounds the outer peripheral end portion of the panel, and a second frame member that extends from the first frame member along the second principal surface of the panel and is disposed in a frame shape on the second principal surface side of the panel, a cutout that exposes the outer peripheral end portion of the panel and the second frame member is provided at a position where the hinge is disposed in the first frame member, and the second frame member has a protruding end that protrudes toward the cutout beyond the outer peripheral end portion of the panel in a portion exposed from the cutout.

According to the present disclosure, it is possible to provide the electronic device capable of suppressing the breakage of the panel of the display.

DESCRIPTION OF EMBODIMENT

Background of Present Disclosure

PTL 1 discloses an information processing apparatus including a first exterior portion, a second exterior portion, and a connection portion that rotatably connects the first exterior portion and the second exterior portion. The information processing apparatus includes a touch panel display accommodated in the first exterior portion, and an outer edge portion of the touch panel display is held by a bezel portion of the exterior portion over the entire circumference. In addition, the first exterior portion and the second exterior portion have a rectangular shape in top view, and the connection portion has a configuration in which a coupling portion having a cylindrical shape formed on one side of the first exterior portion and a coupling portion having a cylindrical shape formed on one side of the second exterior portion are fitted to be rotatable with each other.

In such an information processing apparatus, in a case where the first exterior portion is downsized, it is conceivable to omit the bezel portion of a portion where the coupling portion is not formed in one side of the first exterior portion where the connection portion is formed. However, for example, in a case where the information processing apparatus is dropped, when an impact is applied to the first exterior portion and the panel such as the touch panel display moves toward the coupling portion formed in the second exterior portion, the touch panel display may come into contact with the coupling portion formed in the second exterior portion and may be broken.

Therefore, the present inventors have studied an electronic device capable of suppressing breakage of a panel of a display, and have reached the following disclosure.

Hereinafter, one exemplary embodiment of the present disclosure will be described with reference to accompanying drawings. Note that, the following description is merely exemplary in nature, and is not intended to limit the present disclosure, applications, or uses thereof. Moreover, the drawings are schematic representations, and the ratios between dimensions or the like do not necessarily match the actual dimensions.

Note that, the terms “first”, “second”, and the like used herein are only for the purpose of description, and should not be understood as explicitly or implicitly indicating relative importance or a priority of technical features. The presence of the limitations as “first” and “second” indicate, explicitly or implicitly, that there is one or more of such features.

Exemplary Embodiment

[Electronic Device]

Figure 1:
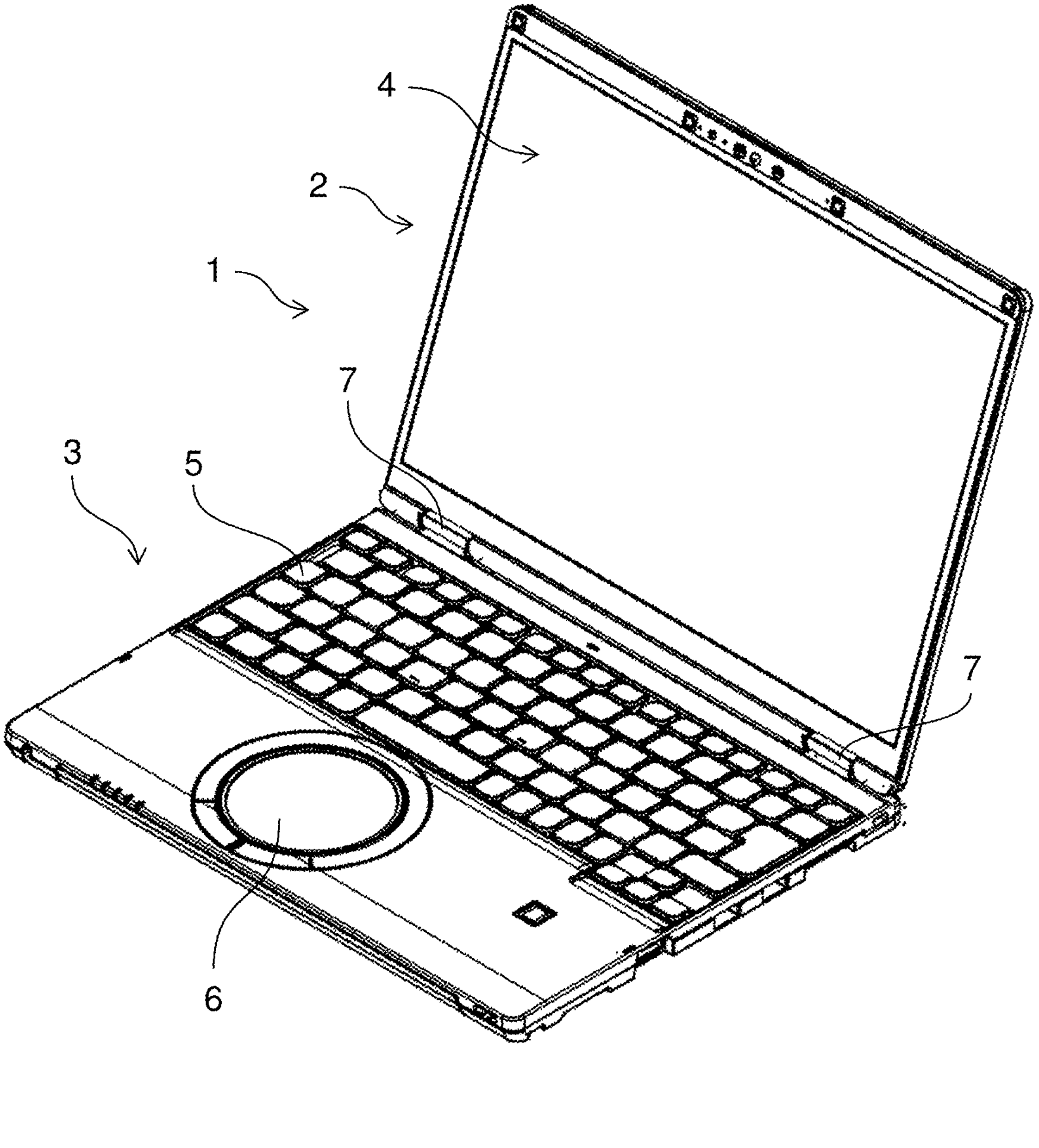
FIG. 1 is a perspective view of an electronic device according to an exemplary embodiment of the present disclosure.

FIG. 1 is a perspective view of one example of electronic device 1 according to an exemplary embodiment of the present disclosure. As illustrated in FIG. 1, electronic device 1 is a notebook personal computer (laptop PC). Electronic device 1 includes first housing 2 and second housing 3. Each of first housing 2 and second housing 3 has a thin box-shaped outer contour and has a rectangular shape.

First housing 2 houses display 4. Display 4 includes a display surface exposed from first housing 2. In addition, first housing 2 houses a camera, an antenna, and the like.

Second housing 3 houses an input unit. The input unit is, for example, keyboard 5 and touch pad 6. The input unit is exposed from second housing 3. Note that, in the present specification, keyboard 5 and touch pad 6 may be referred to as input units 5 and 6. In addition, a circuit such as a CPU or a memory, a battery, and the like are housed inside second housing 3.

First housing 2 and second housing 3 are connected via hinges 7. Hinge 7 rotatably connects first housing 2 and second housing 3. Hinge 7 allows first housing 2 and/or second housing 3 to rotate and bring electronic device 1 into an open state or a closed state. Note that, the "open state" means a state where first housing 2 and second housing 3 are separated from each other and display 4 and input units 5 and 6 are exposed. The "closed state" means a state where first housing 2 and second housing 3 are disposed to face each other, display 4 and input units 5 and 6 face each other, and display 4 and input units 5 and 6 are not exposed.

Figure 2:
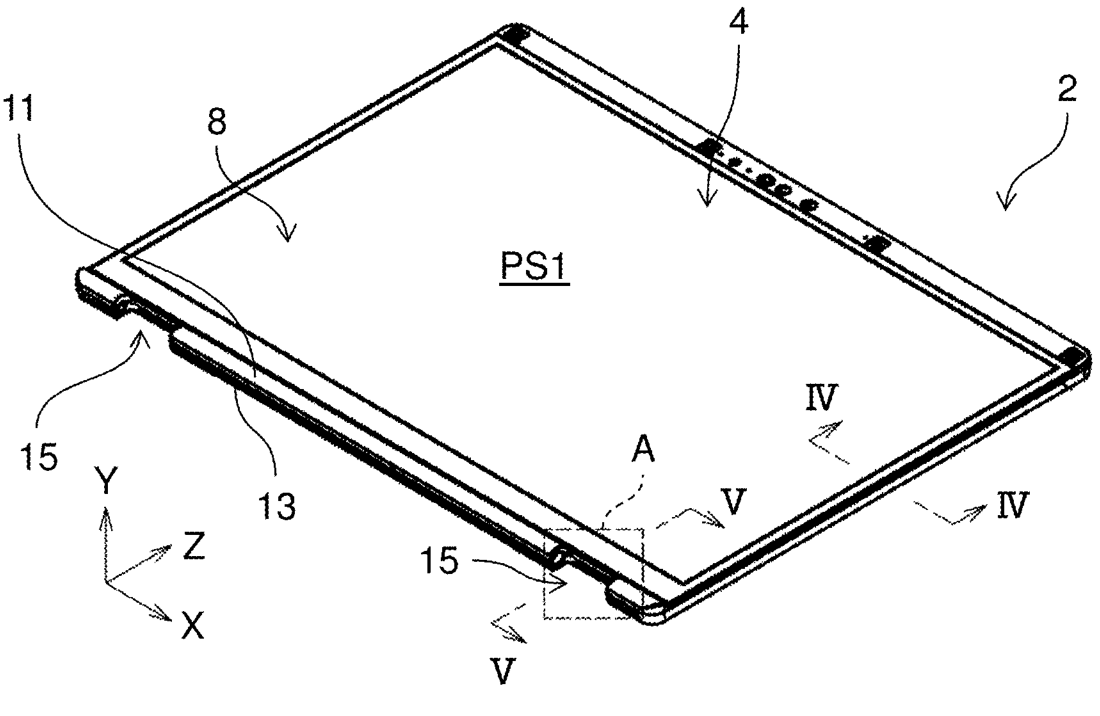
FIG. 2 is a perspective view of a first housing according to the exemplary embodiment of the present disclosure.
Figure 3:
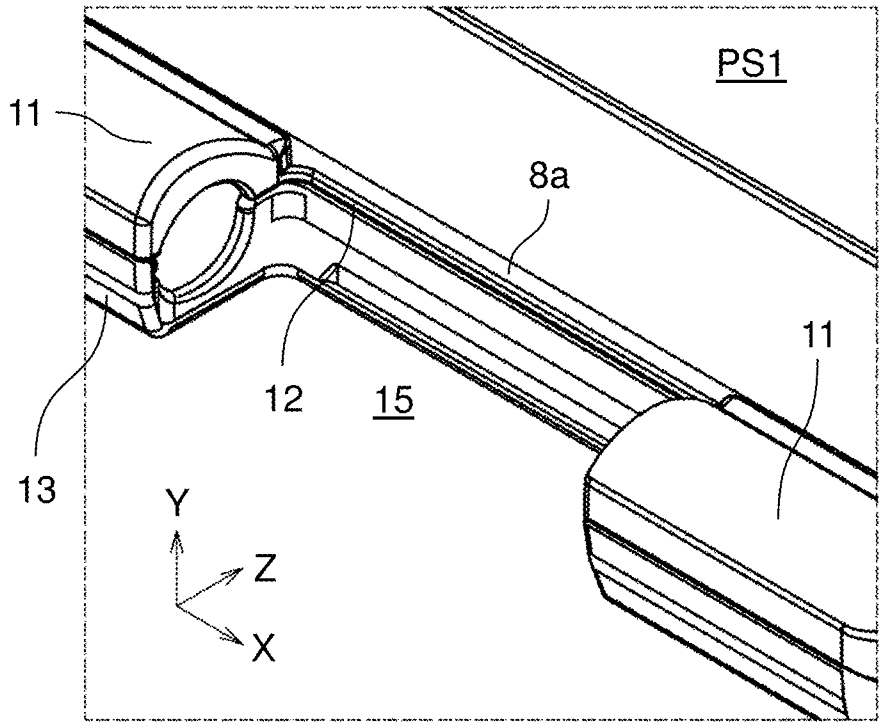
FIG. 3 is an enlarged view of a broken line region III in FIG. 2.
Figure 4:
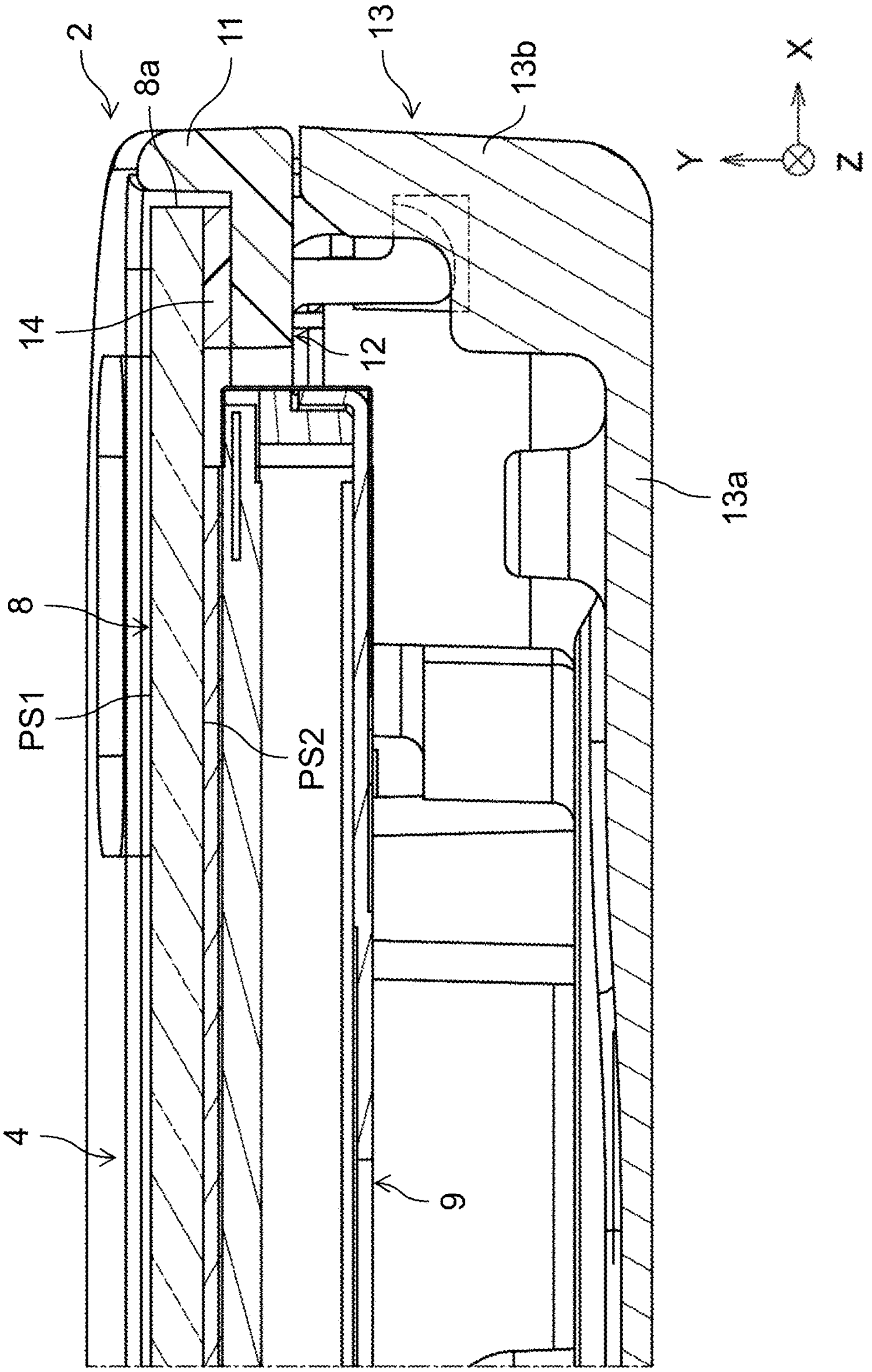
FIG. 4 is a sectional view taken along line IV-IV of FIG. 2.
Figure 5:
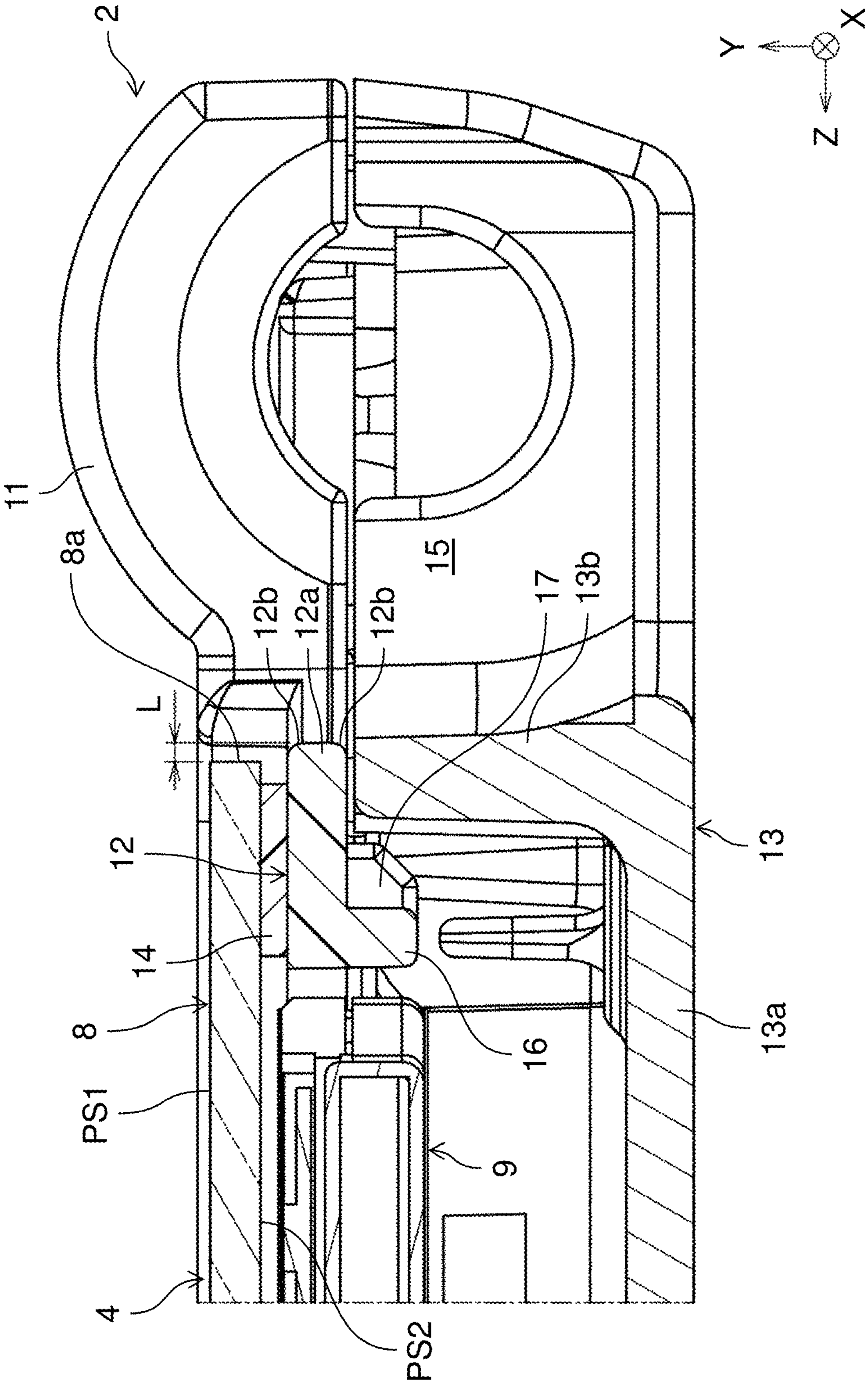
FIG. 5 is a sectional view taken along line V-V of FIG. 2.

FIG. 2 is a perspective view of first housing 2 according to the exemplary embodiment. FIG. 3 is an enlarged view of broken line region III of FIG. 2. FIG. 4 is a sectional view taken along line IV-IV of FIG. 2. FIG. 5 is a sectional view taken along line V-V of FIG. 2. Note that, X, Y, and Z directions in the drawing indicate a width direction, a thickness direction, and a height direction of first housing 2, respectively.

Display

Display 4 displays images. In the exemplary embodiment, display 4 receives a touch operation of a user and displays the image. Display 4 includes touch panel 8 as an input device and a liquid crystal panel as a display device. For example, a capacitive coupling type touch panel, a resistive film type touch panel, or the like can be used as touch panel 8. Touch panel 8 according to the present exemplary embodiment is an example of a panel according to the present disclosure.

Referring to FIGS. 2 to 5, touch panel 8 includes first principal surface PS1, second principal surface PS2 on a side opposite to first principal surface PS1, and outer peripheral end portion 8*a* connecting first principal surface PS1 and second principal surface PS2. Specifically, touch panel 8 is formed in a rectangular plate shape. First principal surface PS1 corresponds to a display surface of touch panel 8. Second principal surface PS2 corresponds to a back surface of touch panel 8. First principal surface PS1 and second principal surface PS2 extend in the X direction and the Z direction.

Liquid crystal unit 9 including a liquid crystal panel that is a display panel for displaying the image, a backlight that is a light source for displaying the image on the liquid crystal panel, a printed circuit board on which electronic components are implemented, and the like is disposed on second principal surface PS2 side of touch panel 8. Liquid crystal unit 9 is attached to touch panel 8.

<First Housing>

Referring to FIGS. 2 to 5, first housing 2 includes first frame members 11, second frame members 12, and top plate members 13.

First frame member 11 has a frame shape surrounding outer peripheral end portion 8*a* of touch panel 8. First frame member 11 protects outer peripheral end portion 8*a* of touch panel 8. First frame member 11 constitutes a portion on a front surface side of first housing 2. First frame member 11 is made of resin. For example, various resin materials such as polycarbonate, acrylonitrile butadiene styrene (ABS), and polyacetal can be used as the material of first frame member 11. A Young's modulus of the material of first frame member 11 is from 1.0 GPa to 3.0 GPa inclusive.

Second frame member 12 is disposed in a frame shape on second principal surface PS2 side of touch panel 8. Second frame member 12 extends from first frame member 11 along second principal surface PS2 of touch panel 8. Second frame members 12 support touch panel 8. In the exemplary embodiment, second frame member 12 is formed integrally with first frame member 11. In other words, first frame member 11 and second frame member 12 have an integral structure. Second frame member 12 is made of resin. For example, various resin materials such as polycarbonate, ABS resin, and polyacetal can be used as the material of second frame member 12. A Young's modulus of the material of second frame member 12 is from 1.0 GPa to 3.0 GPa inclusive.

Second frame members 12 are bonded to second principal surface PS2 of touch panel 8 by adhesive 14. Thus, second frame members 12 are fixed to touch panel 8.

Top plate members 13 are disposed on second principal surface PS2 side of touch panel 8. Top plate member 13 constitutes a portion on a back surface side of first housing 2. Top plate member 13 extends in the X direction and the Z direction, and includes first portion 13*a* covering second principal surface PS2 of touch panel 8, and second portion 13*b* extending in the Y direction from first portion 13*a* toward second frame member 12. Top plate member 13 is made of various metal materials such as a magnesium alloy or an aluminum alloy.

Top plate member 13 is attached to first frame member 11. Hinge 7 is rotatably supported by first frame member 11 and top plate member 13.

As illustrated in FIG. 2, two cutouts 15 at positions where hinges 7 are disposed first housing 2 are provided. Hinges 7 are disposed in two cutouts 15. Two cutouts 15 are disposed at intervals in the X direction. Cutout 15 is disposed at a lower end portion of first housing 2 to open to one side (lower left side in FIG. 2) of first housing 2 in the Z direction. In addition, cutout 15 is provided to penetrate first frame member 11 and top plate member 13 in the Y direction.

Cutout 15 exposes outer peripheral end portion 8*a* of touch panel 8 and second frame member 12 in the Z direction. As illustrated in FIG. 5, second frame member 12 has protruding end 12*a* that protrudes toward cutout 15 beyond outer peripheral end portion 8*a* of touch panel 8 at a portion exposed from cutout 15. Protruding end 12*a* protrudes in the Z direction beyond outer peripheral end portion 8*a* of touch panel 8. In a protruding direction (Z direction) of which protruding end 12*a*, protruding end 12*a* protrudes beyond outer peripheral end portion 8*a* of touch panel 8 by 0.3 mm or more and 1 mm or less. In other words, in the protruding direction (Z direction) of protruding end 12*a*, dimension L from outer peripheral end portion 8*a* of touch panel 8 to an end of protruding end 12*a* is from 0.3 mm to 1 mm inclusive. In addition, arcuate surface 12*b* is provided on a surface of protruding end 12*a* facing cutout 15. Specifically, a corner of protruding end 12*a* is rounded. In the exemplary embodiment, a radius of arcuate surface 12*b* may be from 0.2 mm to 0.4 mm inclusive.

Referring to FIG. 5, first housing 2 includes protruding member 16 and rib 17 provided on protruding member 16.

Protruding member 16 protrudes from second frame member 12 to a side opposite to second principal surface PS2 side of touch panel 8. Protruding member 16 extends in the X direction and the Y direction. Protruding member 16 faces second portion 13*b* of top plate member 13. In the exemplary embodiment, protruding member 16 is formed integrally with second frame member 12. In other words, protruding member 16 and second frame member 12 have an integral structure. Protruding member 16 is made of resin. For example, various resin materials such as polycarbonate, ABS resin, and polyacetal can be used as the material of protruding member 16. A Young's modulus of the material of protruding member 16 is from 1.0 GPa to 3.0 GPa inclusive.

Rib 17 protrudes from a surface of protruding member 16 facing second portion 13*b* of top plate member 13 toward second portion 13*b*. Rib 17 extends in the Y direction and the Z direction. Protruding member 16 and rib 17 are positioned in a range of second frame member 12 in which protruding end 12*a* is provided. Although not illustrated, a plurality of ribs 17 are provided at intervals in the X direction. In the exemplary embodiment, rib 17 is formed integrally with protruding member 16. In other words, rib 17 and protruding member 16 have an integral structure. Rib 17 is made of resin. For example, various resin materials such as polycarbonate, ABS resin, and polyacetal can be used as the material of rib 17. A Young's modulus of the material of rib 17 is from 1.0 GPa to 3.0 GPa inclusive.

Effects

According to electronic device 1 of the exemplary embodiment, the following effects can be obtained.

In the exemplary embodiment, a portion where second frame member 12 is exposed from the cutout has protruding end 12*a* protruding toward cutout 15 beyond outer peripheral end portion 8*a* of touch panel 8. Thus, even in a case where an impact is applied to first housing 2 and touch panel 8 moves toward hinge 7 together with first housing 2, protruding end 12*a* of second frame member 12 comes into contact with hinge 7 before touch panel 8 comes into contact with hinge 7. As a result, since the contact of touch panel 8 with hinge 7 is suppressed, breakage of touch panel 8 can be suppressed.

In the related art, in order to protect the panel of the display from the impact at the time of dropping or the like, the entire circumference of the panel was covered with the frame member. On the other hand, in the exemplary embodiment, protruding end 12*a* of second frame member 12 protrudes toward cutout 15 beyond outer peripheral end portion 8*a* of touch panel 8, and thus, touch panel 8 can be protected from the impact at the time of dropping or the like. Thus, first frame member 11 does not need to cover outer peripheral end portion 8*a* of touch panel 8 at the position where hinge 7 is disposed. As a result, in the exemplary embodiment, as compared with a case where first frame member 11 has a portion covering outer peripheral end portion 8*a* of touch panel 8 at the position where hinge 7 is disposed, since an outer shape of first frame member 11 can be reduced by a thickness of the portion, first housing 2 can be downsized.

Since outer peripheral end portion 8*a* of touch panel 8 and second frame member 12 are exposed by cutout 15, when electronic device 1 is disassembled for repair or the like, touch panel 8 and second frame member 12 can be disassembled from a location where outer peripheral end portion 8*a* of touch panel 8 and second frame member 12 are exposed. As a result, workability at the time of disassembling electronic device 1 can be improved.

Since protruding end 12*a* protrudes beyond outer peripheral end portion 8*a* of touch panel 8 by 0.3 mm or more in the protruding direction of protruding end 12*a*, contact between touch panel 8 and hinge 7 can be reliably prevented. In the protruding direction of protruding end 12*a*, protruding end 12*a* protrudes beyond outer peripheral end portion 8*a* of touch panel 8 by 1 mm or less, so that first housing 2 can be downsized. In the exemplary embodiment, in the protruding direction in which protruding end 12*a*, since protruding end 12*a* protrudes beyond outer peripheral end portion 8*a* of touch panel 8 by 0.3 mm or more and 1 mm or less, it is possible to reduce the size of first housing 2 and suppress the breakage of touch panel 8.

In the exemplary embodiment, since the Young's modulus of the material of second frame member 12 is from 1.0 GPa to 3.0 GPa inclusive, when protruding end 12*a* of second frame member 12 and hinge 7 come into contact with each other, second frame member 12 is deformed, and thus, it is possible to suppress an impact caused by the contact between second frame member 12 and hinge 7 from being transmitted to touch panel 8.

In a case where touch panel 8 and second frame member 12 are not fixed, when the impact is applied to first housing 2, only touch panel 8 moves toward hinge 7, and touch panel 8 and hinge 7 may come into contact with each other. On the other hand, according to the exemplary embodiment, since touch panel 8 and second frame member 12 are fixed, when the impact is applied to first housing 2, second frame member 12 moves in conjunction with touch panel 8. As a result, protruding end 12*a* of second frame member 12 comes into contact with hinge 7 before touch panel 8 comes into contact with hinge 7, and the contact of touch panel 8 with hinge 7 is suppressed. Thus, the breakage of touch panel 8 can be suppressed.

In the exemplary embodiment, since protruding end 12*a* of second frame member 12 has arcuate surface 12*b*, even in a case where protruding end 12*a* of second frame member 12 comes into contact with hinge 7, stress acting on protruding end 12*a* of second frame member 12 is dispersed. As a result, since local concentration of stress on protruding end 12*a* of second frame member 12 is suppressed, the breakage of second frame member 12 can be suppressed.

In the exemplary embodiment, even in a case where the impact is applied to first housing 2 and second frame member 12 tries to move toward hinge 7 relative to top plate member 13, second portion 13*b* of top plate member 13 and rib 17 come into contact with each other, and thus, the movement of second frame member 12 toward hinge 7 is restricted. As a result, since the contact of touch panel 8 housed in first housing 2 with hinge 7 is suppressed, the breakage of touch panel 8 can be suppressed.

In the exemplary embodiment, an example in which the panel according to the present disclosure is the touch panel has been described, but the present disclosure is not limited thereto. The panel according to the present disclosure may be a liquid crystal panel which is the display panel for displaying the image. For example, a transmissive liquid crystal panel, a semi-transmissive liquid crystal panel, a reflective liquid crystal panel, or the like can be used as the liquid crystal panel.

In the exemplary embodiment, an example in which protruding end 12*a* protrudes beyond outer peripheral end portion 8*a* of touch panel 8 by 0.3 mm or more and 1 mm or less in the protruding direction (Z direction) of protruding end 12*a* has been described, but the present disclosure is not limited thereto. In the protruding direction of protruding end 12*a*, protruding end 12*a* may protrude beyond outer peripheral end portion 8*a* of touch panel 8 by less than 0.3 mm. In the protruding direction of protruding end 12*a*, protruding end 12*a* may protrude beyond outer peripheral end portion 8*a* of touch panel 8 by beyond 1 mm.

In the exemplary embodiment, an example in which the Young's modulus of the material of second frame member 12 is from 1.0 GPa to 3.0 GPa inclusive has been described, but the present disclosure is not limited thereto. The Young's modulus of the material of second frame member 12 may be less than 1.0 GPa. The Young's modulus of the material of second frame member 12 may exceed 3.0 GPa.

In the exemplary embodiment, an example in which touch panel 8 is fixed to second frame member 12 has been described, but the present disclosure is not limited thereto. Touch panel 8 may not be fixed to second frame member 12.

In the exemplary embodiment, an example in which protruding end 12*a* of second frame member 12 has arcuate surface 12*b* at the portion exposed from cutout 15 has been described, but the present disclosure is not limited thereto. Protruding end 12*a* of second frame member 12 may have, for example, a right angle corner.

In the exemplary embodiment, an example in which first housing 2 includes protruding member 16 and rib 17 has been described, but the present disclosure is not limited thereto. First housing 2 may not include protruding member 16 and rib 17.

In the exemplary embodiment, an example in which first frame member 11, second frame member 12, protruding member 16, and rib 17 are integrally formed has been described, but the present disclosure is not limited thereto. First frame member 11, second frame member 12, protruding member 16, and rib 17 may be formed separately, or two or three of these members may be integrally formed.

As described above, the exemplary embodiment has been described as an example of the technique disclosed in the present application. The technique according to the present disclosure is, however, not limited to the above exemplary embodiment, and is also applicable to other exemplary embodiments with an appropriate modification, replacement, addition, omission, or the like made thereto.

Although the present invention has been fully described in connection with preferred exemplary embodiments with reference to the accompanying drawings, various modifications and corrections are obvious to those skilled in the art. It is to be understood that such variations and modifications are included insofar as they do not depart from the scope of the invention according to the appended claims.

OVERVIEW OF EXEMPLARY EMBODIMENTS (1) An electronic device according to one aspect of the present disclosure includes a display that includes a panel having a first principal surface, a second principal surface on a side opposite to the first principal surface, and an outer peripheral end portion that connects the first principal surface and the second principal surface, a first housing that houses the display, a second housing that houses an input unit, and a hinge that rotatably connects the first housing and the second housing. The first housing includes a first frame member that surrounds the outer peripheral end portion of the panel, and a second frame member that extends from the first frame member along the second principal surface of the panel and is disposed in a frame shape on the second principal surface side of the panel, a cutout that exposes the outer peripheral end portion of the panel and the second frame member is provided at a position where the hinge is disposed in the first frame member, and the second frame member has a protruding end that protrudes toward the cutout beyond the outer peripheral end portion of the panel in a portion exposed from the cutout.

(2) In the electronic device according to (1), the protruding end may protrude beyond the outer peripheral end portion of the panel by 0.3 mm or more and 1 mm or less in a protruding direction of the protruding end.

(3) In the electronic device according to (1) or (2), a Young's modulus of a material of the second frame member may be from 1.0 GPa to 3.0 GPa inclusive.

(4) In the electronic device according to any one of (1) to (3), the panel may be fixed to the second frame member.

(5) In the electronic device according to any one of (1) to (4), the protruding end of the second frame member may have an arcuate surface in a portion exposed from the cutout.

(6) In the electronic device according to any one of (1) to (5), the first housing may further include a top plate member having a first portion that covers the second principal surface of the panel and a second portion that extends from the first portion toward the second frame member, a protruding member that protrudes from the second frame member to a side opposite to the second principal surface side of the panel and is disposed to face the second portion of the top plate member, and a rib that extends from the protruding member toward the second portion of the top plate member.

(7) In the electronic device according to (1) to (6), the panel may be a touch panel.

REFERENCE MARKS IN THE DRAWINGS

1 electronic device
2 first housing
3 second housing
4 display
15 keyboard (input unit)
6 touch pad (input unit)
7 hinge
8 touch panel
8*a* outer peripheral end portion
9 liquid crystal unit
11 first frame member
12 second frame member
12*a* protruding end portion
12*b* arcuate surface
13 top plate member
13*a* first portion
13*b* second portion
14 adhesive
15 cutout
16 protruding member
17 rib
L dimension
PS1 first principal surface
PS2 second principal surface

The invention claimed is:

1. An electronic device comprising:

a display that includes a panel having a first principal surface, a second principal surface on a side opposite to the first principal surface, and an outer peripheral end portion that connects the first principal surface and the second principal surface;

a first housing that houses the display;

a second housing that houses an input unit; and a hinge that rotatably connects the first housing and the second housing, wherein the first housing includes a first frame member that surrounds the outer peripheral end portion of the panel, and a second frame member that extends from the first frame member along the second principal surface of the panel and is disposed in a frame shape on the second principal surface side of the panel, a cutout that exposes the outer peripheral end portion of the panel and the second frame member is provided at a position where the hinge is disposed in the first frame member, and the second frame member has a protruding end that protrudes toward the cutout beyond the outer peripheral end portion of the panel in a portion exposed from the cutout.

2. The electronic device according to claim 1, wherein the protruding end protrudes beyond the outer peripheral end portion of the panel by 0.3 mm or more and 1 mm or less in a protruding direction of the protruding end.

3. The electronic device according to claim 1, wherein a Young's modulus of a material of the second frame member is from 1.0 GPa to 3.0 GPa inclusive.

4. The electronic device according to claim 1, wherein the panel is fixed to the second frame member.

5. The electronic device according to claim 1, wherein the protruding end of the second frame member has an arcuate surface in a portion exposed from the cutout.

6. The electronic device according to claim 1, wherein the first housing further includes a top plate member having a first portion that covers the second principal surface of the panel and a second portion that extends from the first portion toward the second frame member, a protruding member that protrudes from the second frame member to a side opposite to the second principal surface side of the panel and is disposed to face the second portion of the top plate member, and a rib that extends from the protruding member toward the second portion of the top plate member.

7. The electronic device according to claim 1, wherein the panel is a touch panel.

* * * * *